United States Patent [19]

Channell

[11] Patent Number: 4,592,593

[45] Date of Patent: Jun. 3, 1986

[54] SCISSOR FRAME LIFT APPARATUS FOR DUMP TRUCKS

[76] Inventor: Glenn L. Channell, 3739 S. County Rd. 7, Loveland, Colo. 80537

[21] Appl. No.: 607,141

[22] Filed: May 4, 1984

[51] Int. Cl.$^4$ ............................................. B60P 1/16
[52] U.S. Cl. ................................. 298/22 J; 298/17 S; 298/22 P
[58] Field of Search ................... 298/17 S, 17 B, 22 J, 298/22 P; 187/8.71, 18; 254/124; 414/722; 212/188

[56] References Cited

U.S. PATENT DOCUMENTS

| | | | |
|---|---|---|---|
| 2,671,570 | 3/1954 | Richey | 414/722 |
| 2,698,199 | 12/1954 | Godbersen | 298/22 J |
| 2,730,401 | 1/1956 | Rea | 298/22 P |
| 2,731,293 | 1/1956 | Hutchinson | 298/22 P |
| 3,043,629 | 7/1962 | Schlueter et al. | 298/22 J |
| 3,809,249 | 5/1974 | Channell | 298/17 S |
| 4,148,528 | 4/1979 | Channell | 298/22 J |

Primary Examiner—Robert J. Spar
Assistant Examiner—Janice Krizek
Attorney, Agent, or Firm—John E. Reilly

[57] ABSTRACT

A scissor frame lift apparatus is employed in combination with a dump truck and the like, the hoist including upper and lower pivotally interconnected leg members which in turn are pivotally connected at opposite ends to the underside of the dump body and the chassis of the truck, respectively, and lift cylinders extend along opposite sides of the leg members between the dump body and chassis to elevate and tilt the dump body. The upper limit of advancement of the dump body is controlled by a frame stop member which defines an angular extension of one of the leg members and moves into engagement with the other of the leg members before the cylinders reach their full limit of extension and thereby absorb the force of the dump body when it is lifted to the full limit of its extension about the hinge.

9 Claims, 7 Drawing Figures

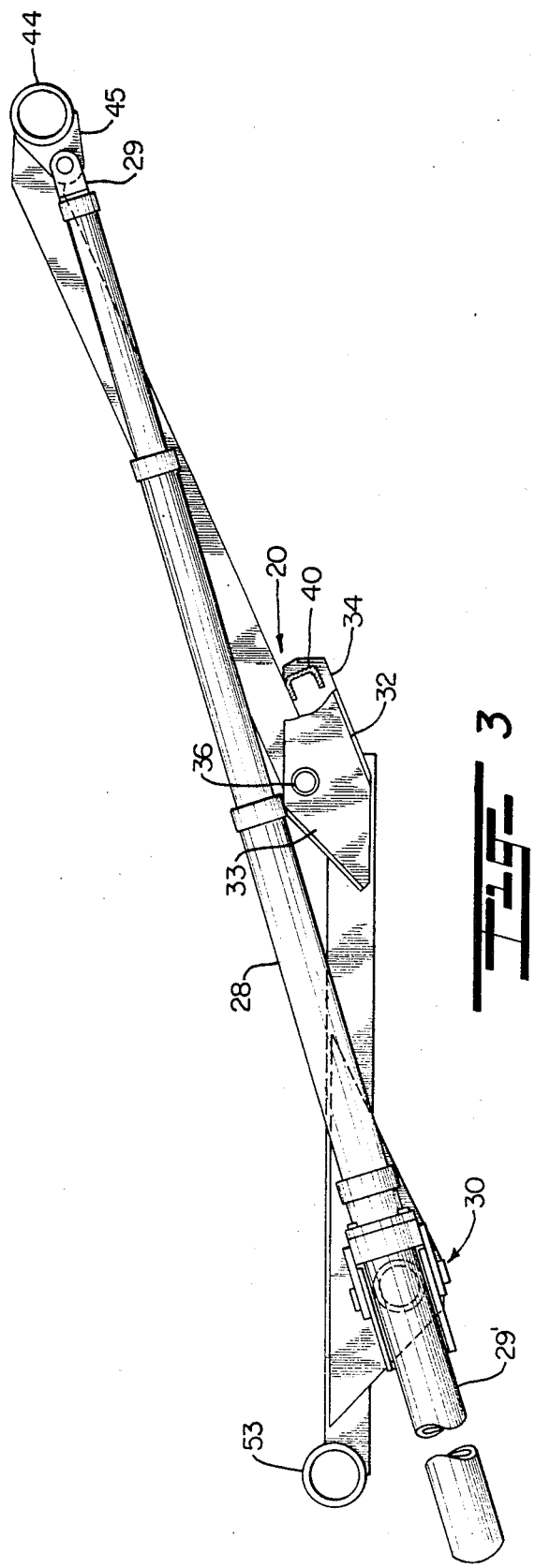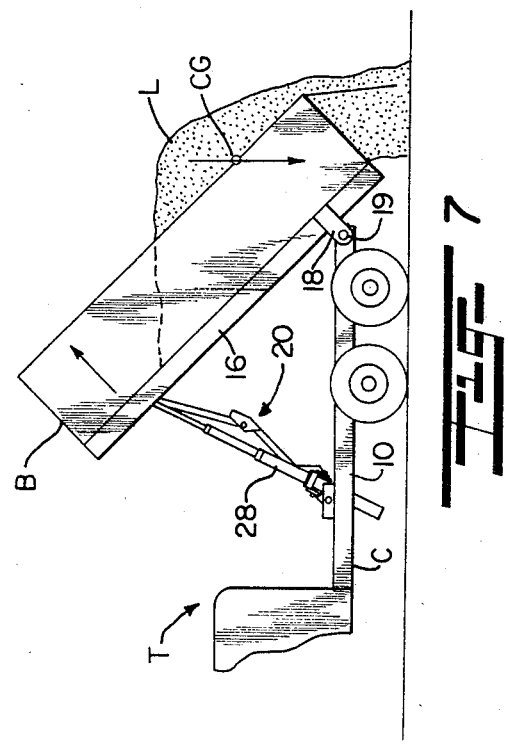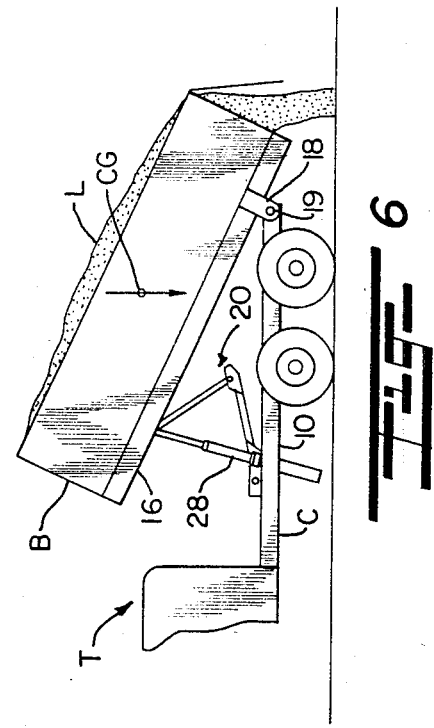

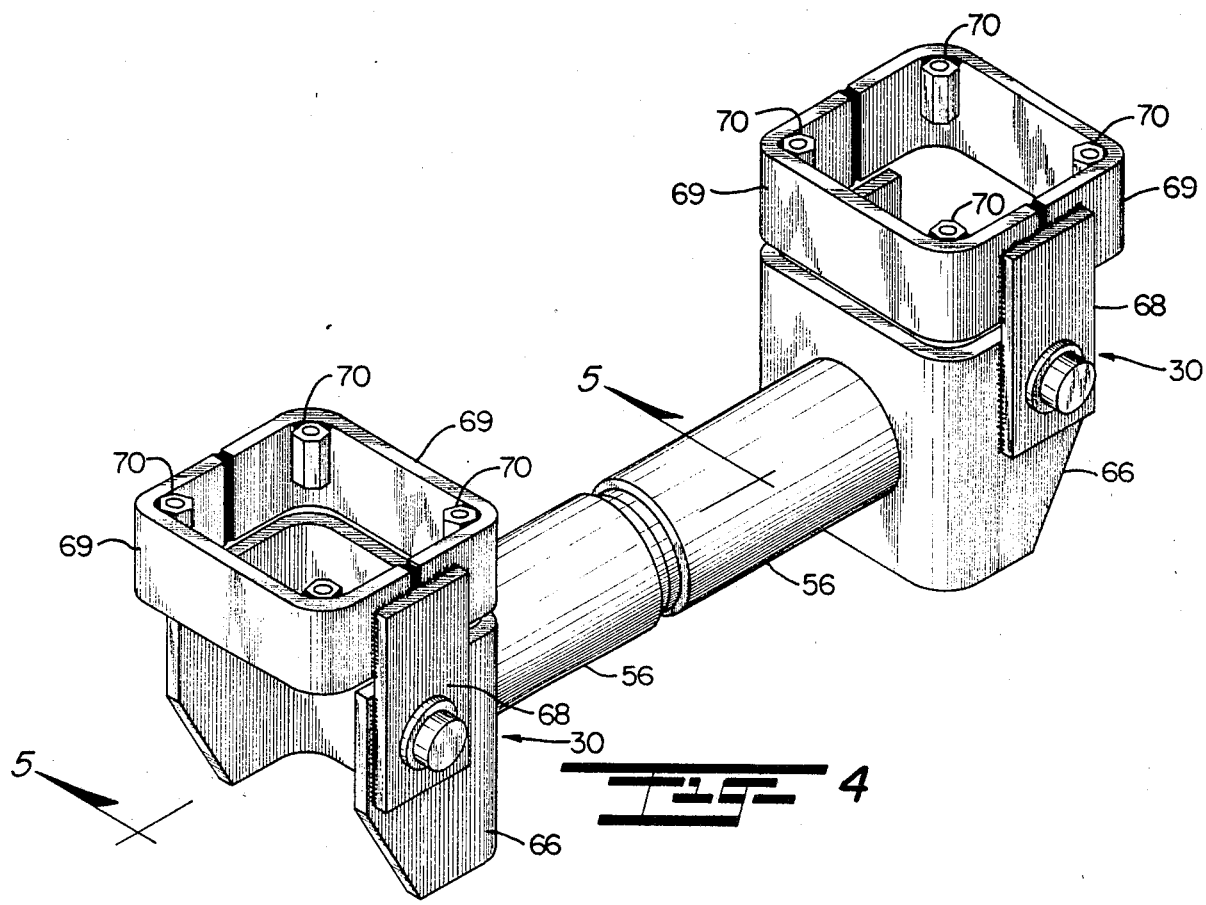
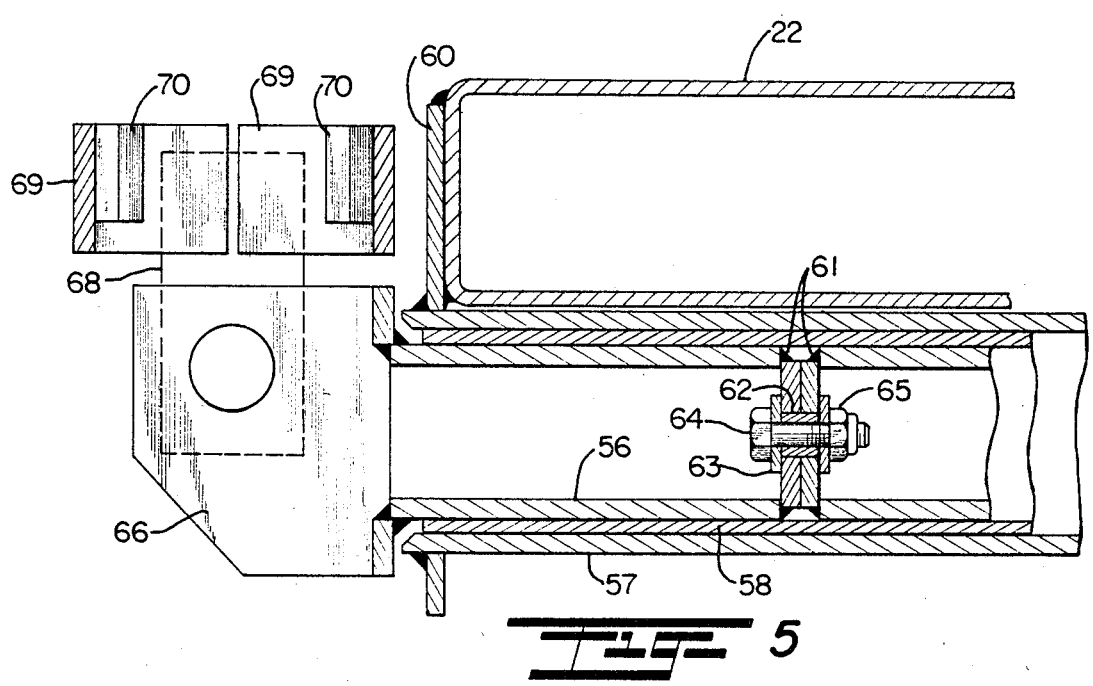

SCISSOR FRAME LIFT APPARATUS FOR DUMP TRUCKS

This invention relates to lift apparatus and more particularly relates to a novel and improved scissor frame lift apparatus which is adaptable for use in elevating the hinged dump body on a dump truck.

BACKGROUND AND FIELD OF THE INVENTION

I have previously devised novel and improved scissor frame hoists employed on dump trucks for the purpose of stabilizing the movement of the dump body as it is elevated and tilted rearwardly by a hydraulic cylinder lift mechanism. For example, reference is made to my U.S. Pat. Nos. 3,809,429 and 4,148,528. In my more recent U.S. Pat. No. 4,148,528, the scissor frame is broadly characterized by comprising upper and lower legs which are pivotally interconnected in end-to-end relation to one another via an elbow pivot which is offset from the legs. Opposite ends of the upper and lower leg members are respectively connected in pivotal relation to the underside of the dump body and to the frame or chassis of the truck.

A criterion of the scissor frame as described in my hereinbefore referred to U.S. Pat. No. 4,148,528 is that the upper and lower leg members are formed as flat rectangular tubes and are dimensioned in length such that in the retracted or lowered position they are capable of extending through the space formed between longitudinal beams of the dump body and chassis as well as to permit the hydraulic cylinder lift members to extend along either side of the scissor frame and similarly to fit within the space formed between the scissor frame and longitudinal base beam members of the truck chassis. In order to lift the dump body, hydraulic pressure is applied to the lift cylinders thereby causing the dump body to be elevated and tilted about a rear hinge axis with the scissor frame resisting any tendency of the dump body to twist or sway as it is lifted. The cylinders may either be single or double-acting and are dimensioned in length so as to extend the dump body to a raised position necessary for the load to be dumped therefrom. The cylinders customarily will reach their limit of extension before the leg members of the scissor frames are fully straightened. As a result, the cylinders must absorb any lift or impact forces once the center of gravity of the load in the dump body is shifted to a degree sufficient to impart continued lift forces to the cylinders. Correspondingly, with loads which are difficult to remove from the dump body, it is customary to alternately raise and lower the dump body through a succession of rapid cylinder strokes. In either case, extremely heavy impact loads are placed on the cylinders which can result in damage to the cylinders and externally cause the cylinder seals to leak.

It is therefore desirable to devise a novel and improved scissor frame hoist assembly which will maintain the requisite stability and torsion resistance in lifting a dump body while at the same time is capable of effectively absorbing impact loads and forces applied by the dump body as it reaches its limit of upward extension in tilting so as to remove such forces from the hydraulic cylinders.

Further, a novel and improved self-centering support for the lower ends of the cylinders enables greater freedom of rotation of the cylinders and minimizes deflection of the saddle support assembly under large cylinder thrust loads. In connection with the latter, greater freedom of rotation of the cylinder together with reduced deflection of the saddle assembly itself is achieved by placing mutually perpendicular pivotal and rotational axes of the saddle assembly in close proximity to one another.

SUMMARY OF THE INVENTION

It is therefore an object of the present invention to provide for a novel and improved scissor frame lift assembly for elevating and tilting a load about a hinge point.

It is another object of the present invention to provide for a novel and improved scissor frame assembly cooperative with a lift mechanism which is adaptable for use in elevating a dump body on a dump truck through a predetermined arc of travel and of effectively absorbing lift or impact forces applied by the dump body at its upper limit of travel.

It is a further object of the present invention to provide in a lift hoist for dump trucks for a novel and improved scissor frame assembly capable of movement between a retracted position disposed within the main frame or chassis of the truck to an extended lift position sufficient to permit the dump truck to deposit its load while absorbing any lift or impact forces applied by the dump body.

It is a still further object of the present invention to provide for a novel and improved scissor frame assembly for dump trucks and the like which is extremely rugged but compact and is capable of controlling the limits of travel of the dump body into the lift position.

It is an additional object of the present invention to provide in a scissor frame assembly which is characterized by having hydraulic cylinder lift members for a self-centering saddle support assembly for the lower end of said cylinders which will enable freedom of rotation of the cylinders while minimizing any deflection of the saddle support assembly.

In accordance with the present invention, there has been devised a lift mechanism wherein a body to be lifted is hinged adjacent one end thereof to a base for swinging movement through a predetermined arc about said hinge, and in combination therewith a scissor frame lift apparatus includes upper and lower leg members pivotally interconnected in end-to-end relation to one another, opposite ends of the upper and lower legs being pivotally connected to the body to be lifted and base, respectively. Lift means take the form of hydraulic cylinder members which extend between opposite ends of the upper and lower leg members for lifting the body about the hinge, and limit stop means includes an angular extension of one of the upper and lower leg members which projects beyond the pivotally interconnected ends and is disposed in the path of travel of the other of the leg members. The limit stop therefore limits extension of the upper and lower leg members in response to lifting by the lift means to a substantially straightened position less than the full extension of said hydraulic cylinders so that the limit stop absorbs the force of the body when it is lifted to the full limit of its extension above the hinge. The hydraulic cylinders are pivotally connected at upper ends adjacent to the underside of the body and at lower ends by self-centering saddle support members which enable both lateral and pivotal movement of the cylinders with respect to the leg members about mutually perpendicular axes in close proximity to one another.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 3 is a side elevational view partially in section of a preferred form of scissor frame hoist in extended position and illustrating in more detail the interrelationship of the leg members and frame stop;

FIG. 4 is a perspective view illustrating a preferred form of self-centering saddle assembly for mounting of the lower ends of the hoist cylinders;

FIG. 5 is a sectional view taken about lines 5—5 of FIG. 4; and

FIGS. 6 and 7 somewhat schematically illustrate the effect of a shifting load during a dumping operation as the dump body is raised and tilted rearwardly by the scissor frame hoist of the present invention.

DETAILED DESCRIPTION OF PREFERRED EMBODIMENT

Figure 1:
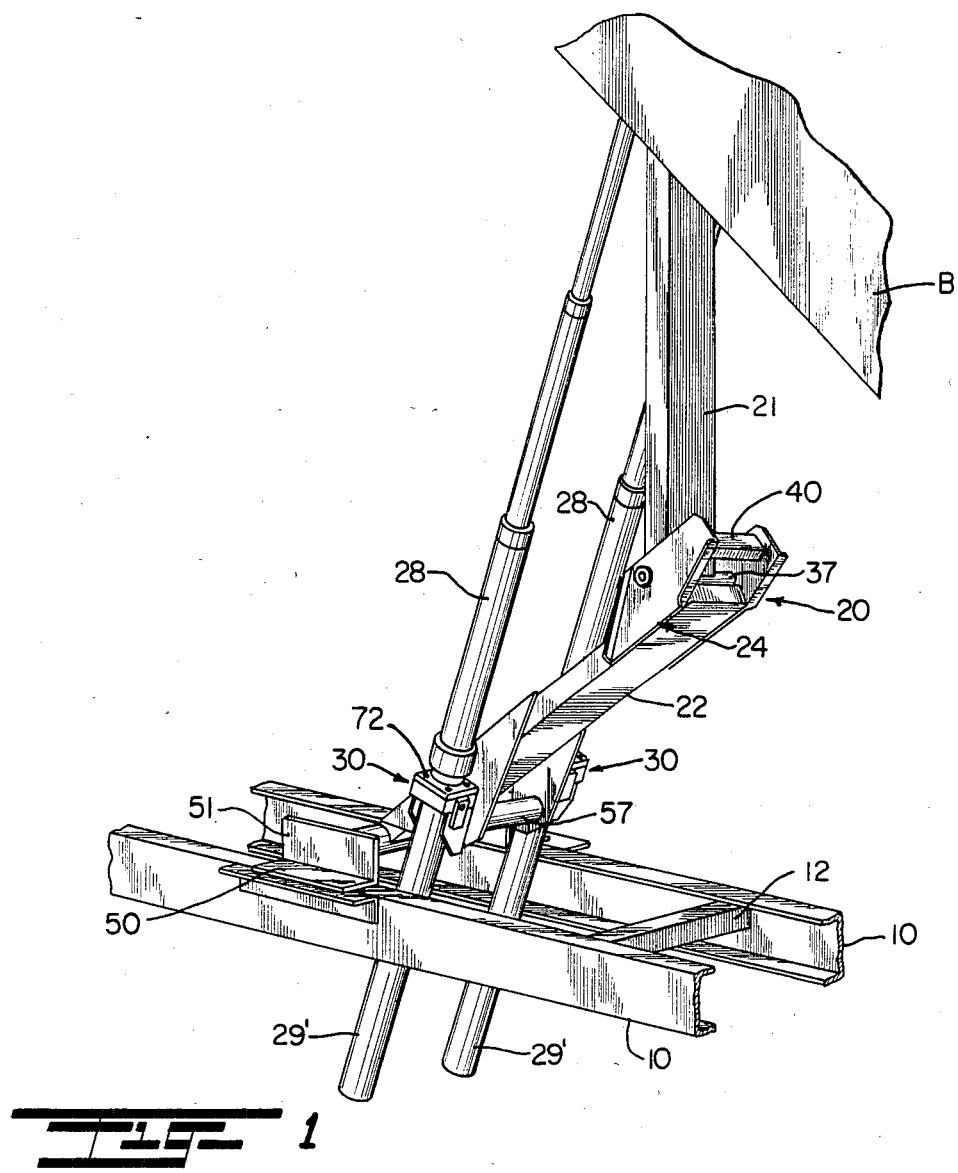
FIG. 1 is a fragmentary, perspective view of a preferred form of scissor frame hoist with frame stop and illustrating the frame in a raised position between the lower chassis and upper dump body of a dump truck.
Figure 2:
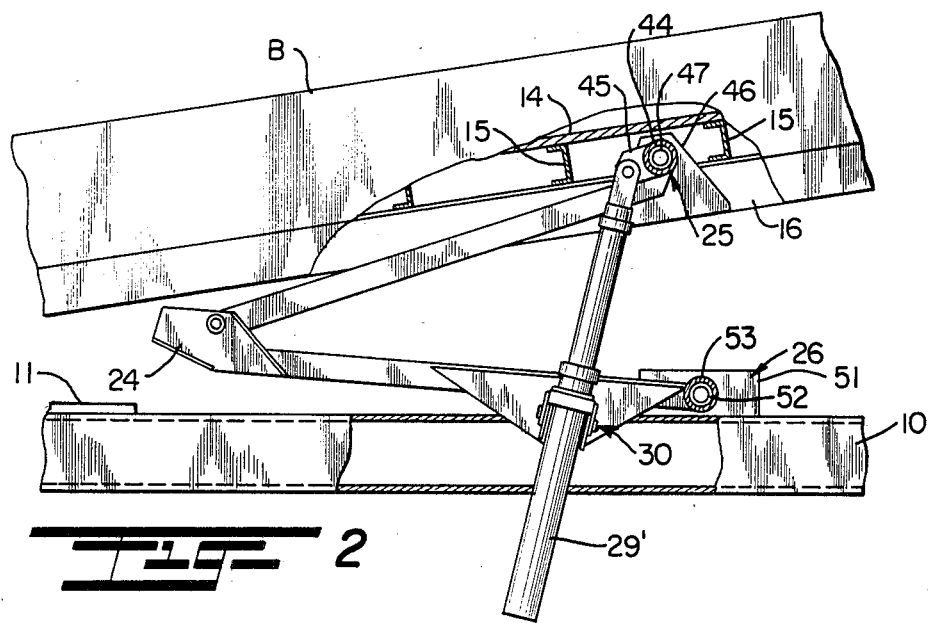
FIG. 2 is a side view in elevation of the preferred form of scissor frame and showing the frame in a partially retracted position between the dump body and lower chassis.

Referring in more detail to the drawings, and as a setting for the present invention, a conventional dump truck T is represented in FIGS. 6 and 7 and includes a dump body B for carrying a load L, the dump body being hinged at its rear end to a base or chassis C of the truck T. The chassis C is conventionally constructed with longitudinally extending base frame members 10 which are disposed in spaced parallel relation to one another by cross members 12, as best seen from FIG. 1. The dump body B is of open rectangular construction having a floor or deck 14 supported on its own base frame which comprises transversely extending brace or sill members 15 at spaced intervals and which are subtended by spaced parallel, longitudinally extending beams 16. The dump body is hinged at its rear end by pivot mounts 18 projecting downwardly from the rear ends of the beams 16 and pivotally connected to a shaft 19 at the rear end of the frame member 10. The beams 16 are superimposed directly upon suitable spacer flanges or risers 11 mounted on the frame members 10, when the dump body B is lowered into its horizontal, travel position resting on the chassis C of the truck. For a more detailed consideration of the construction of the typical beam and frame members on a dump truck, reference is made to my hereinbefore referred to U.S. Pat. No. 4,148,528.

An important feature of the present invention resides in the construction and arrangement of a novel and improved lift apparatus which is comprised of a scissor frame 20 defined by upper and lower leg members 21 and 22 pivotally interconnected in end-to-end relation to one another by a common pivot mount and frame stop assembly 24. The upper end of the leg 21 is pivoted to the underside of the dump body B by an upper pivot mount 25, and the lower end of the lower leg 22 is pivoted to the chassis C of the truck by a lower pivot mount 26, the pivot mounts 25 and 26 preferably being located relatively near the front ends of the dump body and chassis, respectively, and away from the rear hinge section. In addition, the lift apparatus is comprised of hydraulically operated compound cylinders 28 which are disposed in spaced parallel relation to one another and flank opposite sides of the scissor frame 20, the upper rod ends 29 of the cylinders 28 being pivotally connected to the upper pivot mount 25, and the lower cylinder ends 29' being pivotally connected to the lower leg 22 by means of a novel self-centering saddle pivot 30 which is mounted adjacent to pivot mount 26. In the preferred form, multi-stage, single-acting cylinders are illustrated.

The pivotal interconnection between the upper and lower leg members 21 and 22 is such that the leg members are foldable rearwardly toward the rear hinge axis as the dump body is lowered from its upper extended position into a horizontal position against the chassis, although it will be apparent that in accordance with conventional practice the direction of folding of the leg members may be reversed depending upon space and other design requirements. Each leg member is preferably in the form of a rectangular tube having a greater cross-sectional dimension in the transverse or width direction of the truck than in the vertical or height direction, and the combined vertical dimension of the leg members are equal to or less than the combined thickness of the beams 16 and remaining space above the cross members 12 so as not to interfere with movement of the dump body into the lowered horizontal rest position against the chassis C as earlier described.

The intermediate pivot mount and frame stop 24 for the scissor frame is made up of a pair of gusset plates 32 permanently affixed to opposite sides of the upper end of the lower leg member 22, each gusset plate 32 having a first offset portion 33 projecting beyond the upwardly directed face of the lower leg and a second portion 34 which extends angularly beyond the end of the lower leg member 22. A pivot shaft 36 extends transversely between the first offset portions 33 of the gusset plates 32 and through a pivot tube 37 which is mounted at the lower end of the upper leg member 21 so as to extend transversely thereacross. The pivot shaft 36 is preferably mounted by extending through the thickness of the gusset plates and welding or otherwise securely mounting on opposite ends of the shaft in rigid relation to the gusset plates. A frame stop 40 in the form of a transversely extending, thick-walled channel portion is affixed to facing surfaces of the second portions of the gusset plates at a point laterally offset from the upwardly directed face of the lower leg and with the closed end of the channel facing in an upward direction. The frame stop 40 is disposed in the path of travel of the upper leg so as to prevent movement of the upper leg into a fully straightened position with respect to the lower leg 22 but is constrained to extend to a bent position less than the straightened position, as illustrated in FIG. 3; and, in a manner to be described, will absorb any forces or loads applied through the upper leg member by the dump body as it moves to its fully extended dumping position.

The pivot mount 25 for the upper end of the upper leg member 21 generally corresponds to that shown in detail in my hereinbefore referred to U.S. Pat. No. 4,148,528 and will therefore not be described in detail.

As broadly illustrated, it is comprised of a pivot tube 44 welded to the upper extremity of the leg member 21 and flanges 45. Angles having vertical plates 46 are welded to the inner facing surfaces of the beams 16 so as to extend in spaced parallel relation to one another on opposite sides of the pivot tube 44, and stub shafts 47 on the vertical plates 46 are inserted into opposite ends of the pivot tube 44. Suitable spacers, not shown, serve to center the upper end of the leg member 21 between the plates 46. The flanges 45 are affixed to the pivot tube 44 just outboard of the leg member 21 for pivotal connection of the upper rod ends 29 of the cylinders 28 in offset relation to the pivot tube 44.

The lower pivot mount 26 serves to pivotally connect the lower end of the lower leg member at a location directly above the frame members 10 on the chassis C. To this end, right angle brackets 50 are welded on the frame members 10 with upstanding portions 51 disposed in spaced parallel relation to one another, and stub shafts 52 extend transversely of the upstanding portions 51. A pivot tube 53 is affixed to the lower extremity of the leg member 22 so as to extend transversely of the length of the leg, and the stub shafts 52 are inserted into the opposite ends of tube 53, the ends of the shafts 52 being permanently affixed to the inner facing surfaces of the upstanding portions 51. The saddle pivot 30 for the lower ends of the cylinders 28 is mounted on the lower leg member 22 in spaced adjacent relation to the pivot mount 26, there being a pair of saddle support members on opposite sides of the lower leg member 21. Each saddle member has a saddle shaft 56 which projects into a bearing 57 and bearing liner 58, the bearing 57 being welded in an opening formed in a triangular gusset plate 60. As is noted from FIGS. 4 and 5, the gusset plates 60 are mounted on the outsides of the lower leg members 22 adjacent to the pivot mount 26 with the apex of the gusset plate projecting beyond the leg, and the bearing 57 being fixed at opposite ends to the gusset plates. Each saddle shaft 56 is dimensioned to be of a length to extend to the approximate midpoint of the bearing and each is provided with an end plate 61 abutting the end plate of the other shaft 56. The end plates 61 are loosely assembled together by a spacer ring 62 extending through aligned central openings in the plates 61, a large washer 63 on opposite sides of the end plate 61 and a bolt 64 with a self-locking nut 65. The shafts 56 are secured together as described at their end plates 61 leaving a slight gap so that the shafts 56 are free to rotate with respect to one another. A clevis or yoke 66 is affixed to the outer end of each shaft 56 and pivotally supports a split rectangular frame 69 by means of straps 68. Threaded bores 70 are provided at the corners of the frame 69 for threaded connection of a plate 72 in surrounding relation to the cylinder portion 29', the cylinder being free to project through the split frame 69 and clevis 66. It will be noted that the straps 68 are welded at their upper ends to the frame 69 and pivotally connected at their lower ends to the clevis so that the pivotal axis of the straps is in close proximity to the rotational axis of the shafts 56. In this way, there is minimal deflection of the yoke or clevis 66 under large cylinder thrust loads and, with the pivotal axis of the straps being located near the center of the yoke or clevis 66, each cylinder is free to rotate without moving into contact with the yoke.

As illustrated in FIGS. 6 and 7, the dump body B is raised by the application of pressure to the cylinders 28 via pressure lines from a hydraulic circuit, not shown, whereby to cause upward extension of the rod ends 29 at the front end of the body B. The scissor frame will follow the upward extension of the cylinders and undergo upward spreading from a retracted position as described earlier into a partially extended position as shown in FIG. 6 and finally to a substantially straightened position as illustrated in FIG. 7. As the load is gradually removed through the tail gate, beginning at the partially retracted position as illustrated in FIG. 6, the center of gravity as designated at CG will gradually shift from the position of FIG. 6 toward that of FIG. 7; and as the center of gravity of the load is shifted will in many cases impart a lifting force to the hoist tending to raise the forward end of the dump body until the upper leg 21 of the scissor frame moves into engagement with the frame stop. The resultant impact is therefore effectively absorbed by the frame stop and, for this reason, the leg members 21 and 22 are dimensioned in relation to the cylinders 28 such that the upper leg will move into engagement with the frame stop 40 prior to full extension of the cylinders to prevent the application of lifting forces to the cylinders. This is important also where it may become necessary to jar the load loose from the dump body by reciprocating the cylinders in a series of rapid strokes. The self-centering saddle pivot 30 cooperates with the pivot mounts in maintaining the proper relationship between the cylinders and scissor frame while minimizing deflection and permitting some freedom of independent rotation of the lower cylinder ends as described. As indicated previously, single or double-acting cylinders may be employed and may consist either of single or multi-stage cylinders depending upon the length of extension required. A typical cylinder which may be employed and, as illustrated in FIGS. 1 to 7, is a three-stage single-acting telescoping cylinder manufactured by Hydraulics Unlimited of Eaton, Colorado.

It is to be understood from the foregoing that various modifications and changes may be made in the construction and arrangement of elements comprising the preferred embodiment of the present invention without departing from the spirit and scope thereof as defined by the appended claims.

I claim:

1. In a lift mechanism adapted for use in combination with a dump truck wherein said truck has a dump body to be lifted that is hinged adjacent one end thereof to a base for swinging movement through a predetermined arc about said hinge, the combination therewith comprising:

a hoist including upper and lower leg members pivotally interconnected in end-to-end relation to one another, an opposite end of said upper leg member pivotally connected to said body and an opposite end of said lower leg member pivotally connected to said base;

lift means including hydraulic cylinder members extending between said opposite ends of said upper and lower leg members for lifting said body about said hinge; and limit stop means having an angular extension of one of said upper and lower leg members beyond said pivotally interconnected ends of said leg members, said limit stop means defined by a pair of gusset plates affixed to opposite sides of said one leg member, said gusset plates each including a first offset portion projecting laterally from said one leg member having pivot means extending between said gusset plates pivotally interconnecting said upper and lower leg members and said angular extension defined by a second angularly extending portion of said gusset plates projecting beyond said pivot means and a frame stop member extending transversely between said second angularly extending portions and connecting them across said other leg member at a location spaced beyond said pivotally interconnected ends of said leg members, said frame stop member disposed in the path of travel of the other of said leg members whereby said limit stop means limits extension of said upper and lower leg members in response to lifting by said lifting means to a substantially straightened position less than the full extension of said hydraulic cylinders and absorbs the force of said body when it is lifted to the full limit of its extension about said hinge.

2. In a lift mechanism according to claim 1, said upper and lower leg members each defined by elongated rectangular tubes and there being a pair of hydraulic cylinders extending along opposite sides of said upper and lower leg members.

3. In a lift mechanism according to claim 2, a saddle support member interconnecting lower ends of said cylinders and said lower leg members, each saddle support member including first and second pivotal support means for pivotally supporting said lower ends of said cylinders about mutually perpendicular axes.

4. In a lift mechanism according to claim 3, each of said pivotal support axes extending in mutually perpendicular relation to one another and to said lower leg member.

5. In a lift mechanism according to claim 1, said limit stop means having a pair of said gusset plates affixed to opposite sides of said lower leg member, said plates including said first offset portion projecting laterally from said lower leg member having said pivot means extending therebetween, said upper leg member connected to said pivot means for pivotal movement therebetween and said second angularly extending portion of said gusset plates projecting beyond an end of said lower leg member having said frame stop member extending transversely between said second angularly extending portions.

6. In a lift apparatus adapted for use in combination with a dump truck and the like wherein said truck has a chassis and a dump body is hinged to said chassis for upward and rearward tilting movement away from said chassis, a scissor frame having upper and lower leg members pivotally interconnected to one another, said upper leg pivotally connected to said dump body and said lower leg pivotally connected to said chassis, and hydraulically actuated lift cylinders extending between said chassis and said dump body on opposite sides of said scissor frame, the improvement comprising:

limit stop means having an angular extension of one of said upper and lower members beyond said pivotally interconnected ends of said leg members, said limit stop means defined by a pair of gusset plates affixed to opposite sides of said one leg member, said gusset plates each including a first offset portion projecting laterally from said one leg member having pivot means extending between said gusset plates pivotally interconnecting said upper and lower leg members, and said angular extension defined by a second angularly extending portion of said gusset plates projecting beyond said pivot means, and a frame stop member extending transversely between said second angularly extending portions and connecting them across said other leg member at a location spaced beyond said pivotally interconnected ends of said leg members, said frame stop member disposed in the path of travel of the other of said leg members whereby said limit stop means limits extension of said upper and lower leg members in response to lifting by said lifting means to a substantially straightened position less than the full extension of said hydraulic cylinders and absorbs the force of said body when it is lifted to the full limit of its extension about said hinge; and a self-centering saddle support interconnecting lower ends of said cylinder and said lower leg member including a shaft member journaled in a transverse bearing attached to said lower leg member, a yoke at opposite ends of said shaft and a connecting frame pivotally secured to said yoke, a lower end of each cylinder extending through a respective yoke and connecting frame, each lower end having a connecting plate affixed to said connecting frame, each of said connecting plates being rigidly affixed to said connecting frame and pivotally connected to said yoke about an axis normal to and in substantially the same plane as the rotational axis of said shaft.

7. In a lift apparatus according to claim 6, said upper and lower leg members each defined by elongated rectangular tubes and there being a pair of hydraulic cylinders extending along opposite sides of said upper and lower leg members.

8. In a lift apparatus according to claim 6, said hydraulic cylinders being multi-stage cylinders, and said frame stop means operative to limit extension of said upper and lower leg members in response to lifting by said lift means to a position less than the full extension of said hydraulic cylinders whereby said frame stop means absorbs any forces applied by said dump body when it is lifted to the full limit of its extension about said hinge.

9. In a lift apparatus according to claim 6 wherein said chassis includes spaced, longitudinally extending frame members and said dump body includes spaced, longitudinally extending base beams aligned with said frame members, said upper leg member of said scissor frame pivotally connected to said beams and said lower leg member pivotally connected to said frame, said scissor frame and lift cylinders being dimensioned for disposition in spaced relation between said base beams and frame members whereby said base beams are engageable with said frame members when said dump body rests upon the chassis of said truck.

* * * * *